US009329661B2

(12) United States Patent
Deng

(10) Patent No.: US 9,329,661 B2
(45) Date of Patent: May 3, 2016

(54) INFORMATION PROCESSING METHOD AND ELECTRONIC DEVICE

(71) Applicant: Lenovo (Beijing) Limited, Haidian District, Beijing (CN)

(72) Inventor: Yuanyuan Deng, Beijing (CN)

(73) Assignee: Lenovo (Beijing) Limited (CN)

( * ) Notice: Subject to any disclaimer, the term of this patent is extended or adjusted under 35 U.S.C. 154(b) by 293 days.

(21) Appl. No.: 14/219,447

(22) Filed: Mar. 19, 2014

(65) Prior Publication Data

US 2015/0052375 A1 Feb. 19, 2015

(30) Foreign Application Priority Data

Aug. 16, 2013 (CN) .......................... 2013 1 03587802

(51) Int. Cl.
*G06F 1/32* (2006.01)
(52) U.S. Cl.
CPC .................................... *G06F 1/3234* (2013.01)
(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 7,472,267 B2 * | 12/2008 | Park | .......................... | G06F 1/162 713/1 |
| 8,151,105 B2 * | 4/2012 | Park | .......................... | G06F 1/162 710/1 |
| 8,775,844 B1 * | 7/2014 | Peterson | ............... | G06F 1/3265 713/323 |
| 2003/0112585 A1 * | 6/2003 | Silvester | ............... | G06F 1/1616 361/679.41 |
| 2004/0140967 A1 * | 7/2004 | Kojo | ....................... | G06F 1/162 345/204 |
| 2014/0108832 A1 * | 4/2014 | Yamaguchi | ............. | G06F 1/203 713/320 |
| 2014/0122912 A1 * | 5/2014 | Andou | .................. | G06F 1/3265 713/324 |
| 2015/0052375 A1 * | 2/2015 | Deng | .................... | G06F 1/3234 713/323 |

* cited by examiner

*Primary Examiner* — Zahid Choudhury
(74) *Attorney, Agent, or Firm* — Schwegman, Lundberg & Woessner, P.A.

(57) ABSTRACT

The present invention discloses information processing methods, apparatuses and electronic devices. The method comprises: determining sensor units that will normally operate in the low power consumption state based on the i-th usage mode; generating, in response to obtaining an input operation for generating a wake-up instruction via the sensor units, the wake-up instruction; and switching the electronic device from the low power consumption state to the normal operation state in response to the wake-up instruction. With the present invention, sensor units that will normally operate in the low power consumption state are determined based on the i-th usage mode of the electronic device. A wake-up instruction is generated in response to obtaining an input operation via the sensor units. The electronic device is switched from the low power consumption state to the normal operation state in response to the wake-up instruction. The present invention solves the problem that it is difficult to operate an power-on/off button of an electronic device in complicated scenarios and achieves the effect of determining, based on the usage mode of the electronic device, a switching trigger scheme most suitable for the usage mode.

12 Claims, 4 Drawing Sheets

INFORMATION PROCESSING METHOD AND ELECTRONIC DEVICE

RELATED APPLICATIONS

This application claims the benefit of priority under 35 U.S.C. Section 119, to Chinese Patent Application Serial No. 201310358780.2, filed on Aug. 16, 2013, which application is incorporated herein by reference in its entirety.

TECHNICAL FIELD

The present invention relates to electronic technology, and more particularly, to information processing methods and electronic devices.

BACKGROUND

In a sleep state, an electronic device will store all runtime data in a memory and supply power only to necessary components including the memory while deactivating other unnecessary hardware components. When the electronic device is waked up, it can quickly read the data from the memory to enter the operation state before the sleep state.

In order to wake up the electronic device from the sleep state, it is typically required to single click a power-on/off button of the electronic device. After the single click signal associated with the power-on/off button is received by the memory of the electronic device, all the runtime data before the electronic device enters the sleep state will be read from the memory, and the electronic device will be restored from the sleep state to the operation state before the sleep state.

During the implementation of the present invention, the inventors have found at least the following drawbacks in the prior art. With the development of the electronic technology, an electronic device (e.g., a computer) may be used in more complicated scenarios where it is difficult to operate the power-on/off button of the electronic device.

SUMMARY

It is an object of the present invention to provide an information processing method and an electronic device, capable of solving the problem that it is difficult to operate a power-on/off button of an electronic device in complicated scenarios.

In a first aspect, an information processing method is provided. The method is applied in an electronic device having N sensor units, M usage modes, a normal operation state and a low power consumption state, where each of M and N is an integer equal to or larger than 2. The method comprises: generating, when the electronic device is in an i-th usage mode from the M usage modes, the electronic device is in the normal operation state and a predetermined condition is satisfied, a switching instruction for switching the electronic device from the normal operation state to the low power consumption state in the i-th usage mode, where i is an integer equal to or larger than 1 and equal to or smaller than M; switching the electronic device from the normal operation state to the low power consumption state according to the switching instruction; determining, during said switching of the electronic device from the normal operation state to the low power consumption state, K sensor units from the N sensor units that will normally operate in the low power consumption state based on the i-th usage mode, where K is an integer equal to or larger than 1 and equal to or smaller than N; generating, in response to obtaining an input operation for generating a wake-up instruction via the K sensor units when the electronic device is in the low power consumption state, the wake-up instruction for switching the electronic device from the low power consumption state to the normal operation state in the i-th usage mode; and switching the electronic device from the low power consumption state to the normal operation state according to the wake-up instruction.

In an embodiment, the method further comprises, prior to said determining K sensor units that will normally operate in the low power consumption state based on the i-th usage mode: obtaining a device usage form of the electronic device, the device usage form depending on a relative position between components of the electronic device; and determining an usage mode of the electronic device as the i-th usage mode based on the obtained device usage form and a pre-stored first correspondence. The first correspondence is a correspondence between different device usage forms of the electronic device and the M usage modes.

In an embodiment, the components of the electronic device comprise a screen and a keyboard connected to the screen via a rotation axis. Said obtaining a device usage form of the electronic device comprises: obtaining an angle between a plane where the screen is located and a plane where the keyboard is located; and determining the device usage form of the electronic device based on the obtained angle and a pre-stored second correspondence. The second correspondence is a correspondence between different angles and different device usage forms.

In an embodiment, said determining K sensor units that will normally operate in the low power consumption state based on the i-th usage mode comprises: determining the K sensor units that will normally operate in the low power consumption state based on the i-th usage mode and a pre-stored third correspondence. The third correspondence is a correspondence between different usage modes and part or all of the N sensor units, different usage modes correspond to same or different numbers and/or types of sensor units from the N sensor units, different usage modes correspond to different input operations for generating the wake-up instruction that can be obtained by sensor units from the N sensor units, and a current usage mode corresponds to an input operation that is more suitable for an input environment in the current usage mode than input operations corresponding to other usage modes.

In an embodiment, when the electronic device uses a single operating system and operates in different usage modes, the wake-up instruction comprises a single instruction that corresponds to the single operating system and is generated in response to different input operations corresponding to the respective different usage modes, or when the electronic device uses different operating systems and operates in same or different usage modes, the wake-up instruction comprises different instructions that correspond to the respective different operating systems and are generated in response to different input operations corresponding to the respective different usage modes.

In an embodiment, when the i-th usage mode is unsuitable for an external input device of the electronic device to input, the K sensor units that will normally operate in the low power consumption state as determined based on the i-th usage mode comprise vibration sensors. Said generating a wake-up instruction in response to obtaining an input operation for generating the wake-up instruction via the K sensor units when the electronic device is in the low power consumption state comprises: obtaining n successive tappings via the vibration sensor; and generating the wake-up instruction when the number n of the tappings matches a predetermined number and/or a tapping pattern of the n tappings matches a predetermined pattern, wherein n is an integer equal to or larger than 1.

In another aspect, an electronic device is provided. The electronic device has N sensor units, M usage modes, a normal operation state and a low power consumption state, where each of M and N is an integer equal to or larger than 2. The electronic device comprises at least one processor configured to implement: a switching instruction generating module configured to generate, when the electronic device is in an i-th usage mode from the M usage modes, the electronic device is in the normal operation state and a predetermined condition is satisfied, a switching instruction for switching the electronic device from the normal operation state to the low power consumption state in the i-th usage mode, where i is an integer equal to or larger than 1 and equal to or smaller than M; a first switching module configured to switch the electronic device from the normal operation state to the low power consumption state according to the switching instruction generated by the switching instruction generating module; a sensor determining module configured to determine, during said switching of the electronic device from the normal operation state to the low power consumption state, K sensor units from the N sensor units that will normally operate in the low power consumption state based on the i-th usage mode, where K is an integer equal to or larger than 1 and equal to or smaller than N; a wake-up instruction generating module configured to generate, in response to obtaining an input operation for generating a wake-up instruction via the K sensor units when the electronic device is in the low power consumption state, the wake-up instruction for switching the electronic device from the low power consumption state to the normal operation state in the i-th usage mode; and a second switching module configured to switch the electronic device from the low power consumption state to the normal operation state according to the wake-up instruction generated by the wake-up instruction generating module.

In an embodiment, the electronic device further comprises: a form obtaining module configured to obtain a device usage form of the electronic device, the device usage form depending on a relative position between components of the electronic device; and a usage mode determining module configured to determine an usage mode of the electronic device as the i-th usage mode based on the device usage form obtained by the form obtaining module and a pre-stored first correspondence. The first correspondence is a correspondence between different device usage forms of the electronic device and the M usage modes.

In an embodiment, the components of the electronic device comprise a screen and a keyboard connected to the screen via a rotation axis. The form obtaining module comprises: an angle obtaining unit configured to obtain an angle between a plane where the screen is located and a plane where the keyboard is located; and a form determining unit configured to determine the device usage form of the electronic device based on the angle obtained by the angle obtaining unit and a pre-stored second correspondence. The second correspondence is a correspondence between different angles and different device usage forms.

In an embodiment, the sensor determining module is configured to determine the K sensor units that will normally operate in the low power consumption state based on the i-th usage mode and a pre-stored third correspondence. The third correspondence is a correspondence between different usage modes and part or all of the N sensor units, different usage modes correspond to same or different numbers and/or types of sensor units from the N sensor units, different usage modes correspond to different input operations for generating the wake-up instruction that can be obtained by sensor units from the N sensor units, and a current usage mode corresponds to an input operation that is more suitable for an input environment in the current usage mode than input operations corresponding to other usage modes.

In an embodiment, when the electronic device uses a single operating system and operates in different usage modes, the wake-up instruction comprises a single instruction that corresponds to the single operating system and is generated in response to different input operations corresponding to the respective different usage modes, or when the electronic device uses different operating systems and operates in same or different usage modes, the wake-up instruction comprises different instructions that correspond to the respective different operating systems and are generated in response to different input operations corresponding to the respective different usage modes.

In an embodiment, when the i-th usage mode is unsuitable for an external input device of the electronic device to input, the K sensor units comprise vibration sensors. The wake-up instruction generating module comprises: a tap obtaining unit configured to obtain n successive tappings via the vibration sensor; and a wake-up instruction generating unit configured to generate the wake-up instruction when the number n of the tappings matches a predetermined number and/or a tapping pattern of the n tappings matches a predetermined pattern, wherein n is an integer equal to or larger than 1.

The solutions according to the embodiments of the present invention have the following advantageous effects. When the electronic device is switched from the normal operation state to the low power consumption state, K sensor units that will normally operate in the low power consumption state are determined based on the i-th usage mode in which the electronic device is operating. In response to obtaining an input operation for generating a wake-up instruction via the K sensor units when the electronic device is in the low power consumption state, the wake-up instruction is generated, and the electronic device is switched from the low power consumption state to the normal operation state according to the wake-up instruction. The present invention solves the problem that it is difficult to operate an power-on/off button of an electronic device in complicated scenarios, and the switching of the electronic device from the low power consumption state to the normal operation state can only be triggered by single clicking the power-on/off button of the electronic device. The present invention achieves the effect of determining, based on the usage mode of the electronic device, a switching trigger scheme most suitable for the usage mode.

BRIEF DESCRIPTION OF THE DRAWINGS

In order to illustrate the solutions according to the embodiments of the present invention in further detail, the figures used for description of the embodiments will be introduced briefly here. It is apparent to those skilled in the art that the figures introduced below only illustrate some embodiments of the present invention and other figures can be obtained from these figures without applying any inventive skills.

DETAILED DESCRIPTION OF THE EMBODIMENTS

In the following, the embodiments of the present invention will be further detailed with reference to the figures, such that the objects, solutions and advantages of the present invention will become more apparent.

Figure 1:
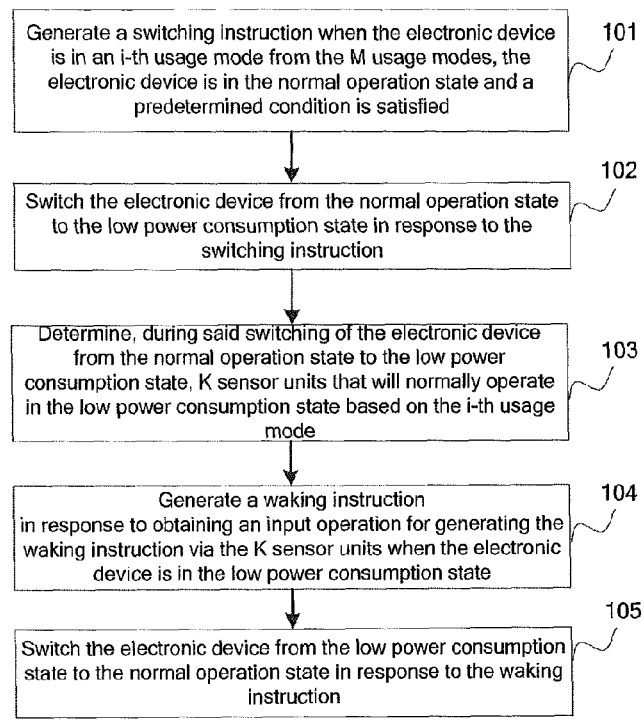
FIG. 1 is a flowchart illustrating an information processing method according to an embodiment of the present invention.

Reference is now made to FIG. 1, which shows a flowchart illustrating an information processing method according to an embodiment of the present invention. The information processing method is applied in an electronic device having N sensor units, M usage modes, a normal operation state and a low power consumption state, where each of M and N is an integer equal to or larger than 2. The information processing method includes the following steps.

At step 101, when the electronic device is in an i-th usage mode from the M usage modes, the electronic device is in the normal operation state and a predetermined condition is satisfied, a switching instruction is generated.

When the electronic device is in an i-th usage mode from the M usage modes, the electronic device is in the normal operation state and a predetermined condition is satisfied, the electronic device generates a switching instruction for switching the electronic device from the normal operation state to the low power consumption state in the i-th usage mode, where i is an integer equal to or larger than 1 and equal to or smaller than M.

At step 102, the electronic device is switched from the normal operation state to the low power consumption state according to the switching instruction.

The electronic device switches the electronic device from the normal operation state to the low power consumption state according to the switching instruction.

At step 103, during the switching of the electronic device from the normal operation state to the low power consumption state, K sensor units that will normally operate in the low power consumption state are determined based on the i-th usage mode.

During the switching of the electronic device from the normal operation state to the low power consumption state, the electronic device determines, based on the i-th usage mode, K sensor units from the N sensor units that will normally operate in the low power consumption state, where K is an integer equal to or larger than 1 and equal to or smaller than N.

At step 104, in response to obtaining an input operation for generating a wake-up instruction via the K sensor units when the electronic device is in the low power consumption state, a wake-up instruction is generated.

In response to obtaining an input operation for generating a wake-up instruction via the K sensor units when the electronic device is in the low power consumption state, the electronic device generates the wake-up instruction for switching the electronic device from the low power consumption state to the normal operation state in the i-th usage mode.

At step 105, the electronic device is switched from the low power consumption state to the normal operation state according to the wake-up instruction.

The electronic device switches the electronic device from the low power consumption state to the normal operation state according to the wake-up instruction.

As discussed above, with the information processing method according to the embodiment of the present invention, when the electronic device is switched from the normal operation state to the low power consumption state, K sensor units that will normally operate in the low power consumption state are determined based on the i-th usage mode in which the electronic device operates. In response to obtaining an input operation for generating a wake-up instruction via the K sensor units when the electronic device is in the low power consumption state, the wake-up instruction is generated and the electronic device is switched from the low power consumption state to the normal operation state according to the wake-up instruction. The present invention solves the problem that it is difficult to operate an power-on/off button of an electronic device in complicated scenarios and the switching of the electronic device from the low power consumption state to the normal operation state can only be triggered by single clicking the power-on/off button of the electronic device. The present invention achieves the effect of determining, based on the usage mode of the electronic device, a switching trigger scheme most suitable for the usage mode.

Many electronic devices have various usage modes depending on usage scenarios. For example, a computer X shown in FIG. 2 has four usage modes: notebook mode, tablet mode, standing mode and tent mode. These four modes are applicable in different usage scenarios, respectively. For example, the notebook mode is applicable in office scenario, the tablet mode is applicable in traveling and playing scenario, the standing mode is applicable in entertainment scenario and the tent mode is applicable in relaxation scenario. The embodiment of the present invention will be described below with reference to an example where the electronic device is the computer X, M=4 and N=4.

Figure 3:
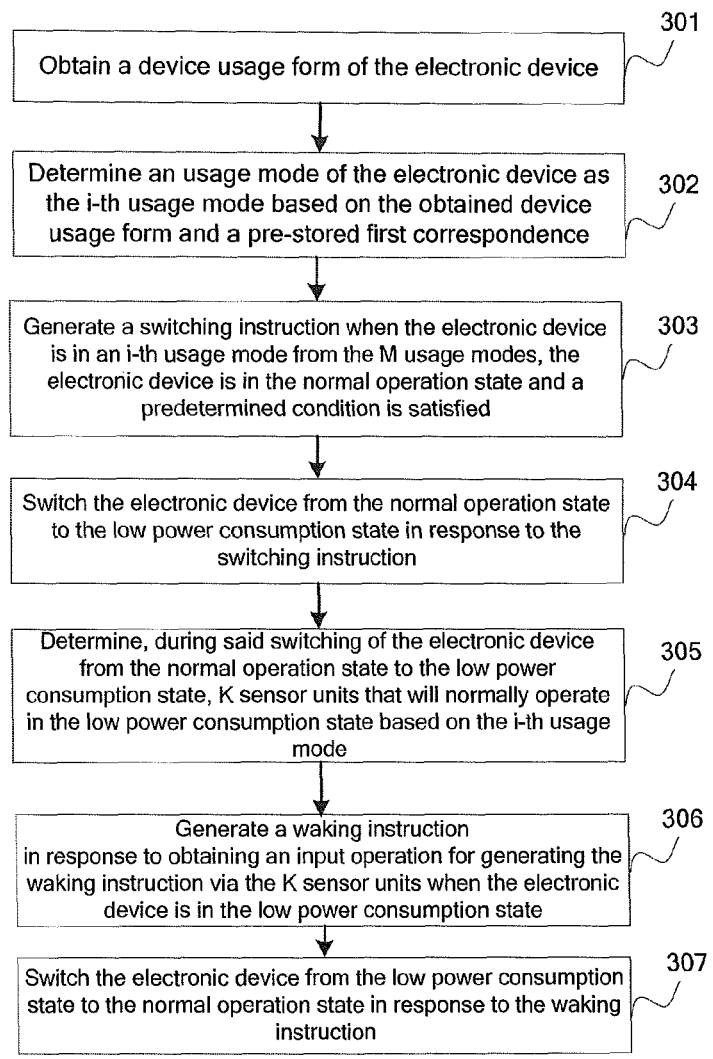
FIG. 3 is a flowchart illustrating an information processing method according to another embodiment of the present invention.

Reference is now made to FIG. 3, which shows a flowchart illustrating an information processing method according to another embodiment of the present invention. The information processing method is applied in an electronic device having N sensor units, M usage modes, a normal operation state and a low power consumption state, where each of M and N is an integer equal to or larger than 2. The information processing method includes the following steps.

At step 301, a device usage form of the electronic device is obtained.

The device usage form depends on a relative position between components of the electronic device. Here, the components of the electronic device include a screen and a keyboard connected to the screen via a rotation axis.

For example, the device usage form of the computer X depends on the relative position between the screen 201 and the keyboard 202 connected to the screen 201 via a rotation axis.

In particular, the step of obtaining a device usage form of the electronic device includes the following two sub-steps.

First, an angle between a plane where the screen is located and a plane where the keyboard is located is obtained.

For example, the computer X may detect, using a built-in detection unit, that the angle between the plane where the screen 201 is located and the plane where the keyboard 202 is located in the current device usage form of the computer X is 330 degrees.

Second, the device usage form of the electronic device is determined based on the obtained angle and a pre-stored second correspondence.

The electronic device determines the device usage form of the electronic device based on the obtained angle and a pre-stored second correspondence. Here, the second correspondence is a correspondence between different angles and different device usage forms, e.g., the angles corresponding to the four device usage forms of the computer X as shown in FIG. 2.

Figure 2:
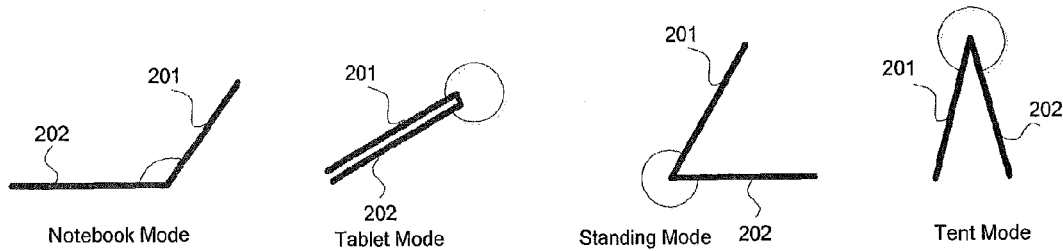
FIG. 2 is a schematic diagram showing a usage scenario of an information processing method according to another embodiment of the present invention.

Referring to FIG. 2, the second correspondence may indicate the device usage form of the computer X as a first usage form when the angle falls in a range from 90 degrees to 135 degrees, the device usage form of the computer X as a second usage form when the angle falls in a range from 355 degrees to 360 degrees, the device usage form of the computer X as a third usage form when the angle falls in a range from 270 degrees to 315 degrees, and the device usage form of the computer X as a fourth usage form when the angle falls in a range from 320 degrees to 350 degrees.

Based on the angle of 330 degrees between the plane where the screen 201 is located and the plane where the keyboard 202 is located in the current device usage form of the computer X as obtained in the first sub-step, it can be determined from the second correspondence that the device usage form of the computer X is the fourth device usage form.

At step 302, an usage mode of the electronic device is determined as the i-th usage mode based on the obtained device usage form and a pre-stored first correspondence.

The electronic device determines a usage mode of the electronic device as the i-th usage mode based on the obtained device usage form and a pre-stored first correspondence. Here, the first correspondence is a correspondence between different device usage forms of the electronic device and the M usage modes.

For example, the first correspondence may indicate the usage mode of the computer X as a first usage mode when the device usage form of the computer X is the first usage form, the usage mode of the computer X as a second usage mode when the device usage form of the computer X is the second usage form, the usage mode of the computer X as a third usage mode when the device usage form of the computer X is the third usage form, and the usage mode of the computer X as a fourth usage mode when the device usage form of the computer X is the fourth usage form.

For the purpose of illustration, the embodiment of the present invention will be described with reference to an example where the first usage mode is the notebook mode, the second usage mode is the tablet mode, the third usage mode is the standing mode and the fourth usage mode is the tent mode.

Based on the fourth usage form of the computer X as determined in the step 301, it can be determined from the first correspondence that the usage mode of the computer X is the fourth usage mode, i.e., the tent mode.

At step 303, when the electronic device is in an i-th usage mode from the M usage modes, the electronic device is in the normal operation state and a predetermined condition is satisfied, a switching instruction is generated.

When the electronic device is in an i-th usage mode from the M usage modes, the electronic device is in the normal operation state and a predetermined condition is satisfied, the electronic device generates a switching instruction for switching the electronic device from the normal operation state to the low power consumption state in the i-th usage mode, where i is an integer equal to or larger than 1 and equal to or smaller than M.

For example, when the computer X is in the tent mode and is in the normal operation state, and when no operation has been detected for a predetermined time period, the computer X generates a switching instruction for switching the computer X from the normal operation state to the low power consumption state (i.e., the sleep state) in the tent mode.

At step 304, the electronic device is switched from the normal operation state to the low power consumption state according to the switching instruction.

The electronic device switches the electronic device from the normal operation state to the low power consumption state according to the switching instruction.

For example, the computer X switches the computer X from the normal operation state to the sleep state according to the generated switching instruction.

At step 305, during the switching of the electronic device from the normal operation state to the low power consumption state, K sensor units that will normally operate in the low power consumption state are determined based on the i-th usage mode.

In particular, during the switching of the electronic device from the normal operation state to the low power consumption state, the electronic device determines K sensor units from the N sensor units that will normally operate in the low power consumption state based on the i-th usage mode and a pre-stored third correspondence, where K is an integer equal to or larger than 1 and equal to or smaller than N.

Here, the third correspondence is a correspondence between different usage modes and part or all of the N sensor units. Different usage modes correspond to same or different numbers and/or types of sensor units from the N sensor units. Different usage modes correspond to different input operations for generating the wake-up instruction that can be obtained by sensor units from the N sensor units. A current usage mode corresponds to an input operation that is more suitable for an input environment in the current usage mode than input operations corresponding to other usage modes.

For example, the third correspondence may indicate a sensor unit corresponding to the notebook mode as a power button single-click sensor unit, a sensor unit corresponding to the tablet mode as a touch sensor unit, a sensor unit corresponding to the standing mode as the power button single-click sensor unit and/or the touch sensor unit, and a sensor unit corresponding to the tent mode as a vibration sensor unit.

When the computer X is in the notebook mode as shown in FIG. 2, the corresponding sensor unit is the power button single-click sensor unit. Since the notebook mode is applicable in the office scenario having an input environment more suitable for an input operation of single clicking a power button, the input operation corresponding to the notebook mode is an input operation of single clicking a power button.

When the computer X is in the tablet mode as shown in FIG. 2, the corresponding sensor unit is the touch sensor unit. Since the tablet mode is applicable in the traveling and playing scenario having an input environment more suitable for a touch operation, the input operation corresponding to the tablet mode is a touch operation.

When the computer X is in the standing mode as shown in FIG. 2, the corresponding sensor unit is the power button single-click sensor unit and/or the touch sensor unit. Since the standing mode is applicable in the entertainment scenario having an input environment more suitable for both an input operation of single clicking a power button and a touch operation, the input operation corresponding to the standing mode can be an input operation of single clicking a power button or a touch operation, depending on the setting of the computer X. For example, if the computer X sets the power button single-click sensor unit as the sensor unit corresponding to the standing mode, the input operation corresponding to the standing mode is an input operation of single clicking a power button. If the computer X sets the touch sensor unit as the sensor unit corresponding to the standing mode, the input operation corresponding to the standing mode is a touch operation. If the computer X sets the power button single-click sensor unit and the touch sensor unit as the sensor units corresponding to the standing mode, the input operations corresponding to the standing mode are an input operation of single clicking a power button and a touch operation.

When the computer X is in the tent mode as shown in FIG. 2, the corresponding sensor unit is the vibration sensor unit. Since the tent mode is applicable in the relaxation scenario having an input environment more suitable for a tapping operation, the input operation corresponding to the tent mode is a tapping operation.

Hence, when the computer X is switched from the normal operation state to the sleep state, based on the current tent mode of the computer X as determined in the step 302 and the third correspondence, it is determined that one sensor unit, i.e., the vibration sensor unit, needs to normally operate in the low power consumption state.

At step 306, in response to obtaining an input operation for generating a wake-up instruction via the K sensor units when the electronic device is in the low power consumption state, the wake-up instruction is generated.

In response to obtaining an input operation for generating a wake-up instruction via the K sensor units when the electronic device is in the low power consumption state, the electronic device generates the wake-up instruction for switching the electronic device from the low power consumption state to the normal operation state in the i-th usage mode.

When the i-th usage mode is unsuitable for performing input operations by an external input device of the electronic device, the K sensor units that will normally operate in the low power consumption state as determined based on the i-th usage mode include the vibration sensor.

The tent mode as shown in FIG. 2 is unsuitable for performing input operations by an external input device of the electronic device. Thus, when the computer X is in the low power consumption state in the tent mode, the step of generating a wake-up instruction in response to obtaining an input operation for generating the wake-up instruction via the K sensor units includes in particular the following two sub-steps.

In the first sub-step, n successive tappings are obtained via the vibration sensor, where n is an integer equal to or larger than 1.

For example, the computer X obtains n successive tappings via a built-in vibration sensor unit.

In the second sub-step, the wake-up instruction is generated when the number n of the tappings matches a predetermined number and/or a tapping pattern of the n tappings matches a predetermined pattern.

For example, when the computer X detects that the number n of the n successive tappings as obtained by the vibration sensor unit is a predetermined number (e.g., 3), or that a tapping pattern of the n tappings matches a predetermined pattern (e.g., two successive tappings), the wake-up instruction is generated in response to the tappings.

At step 307, the electronic device is switched from the low power consumption state to the normal operation state according to the wake-up instruction.

The electronic device switches the electronic device from the low power consumption state to the normal operation state according to the wake-up instruction.

For example, when the computer X receives a tapping signal for generating a wake-up signal while it is in the sleep state in the tent mode, the computer X is switched from the sleep state to the normal operation state according to the wake-up signal.

It is to be noted here that, in order to protect user privacy, a process of identity verification is typically required while the electronic device is switched from the low power consumption state to the normal operation state. That is, when the electronic device receives the input operation for generating the wake-up instruction via the K sensor units, an interface for identity verification is displayed on the display interface of the electronic device. When the identity verification is successful, the electronic device displays an interface for an operation executed before the low power consumption state.

The process of identity verification may be done using a traditional identity verification scheme. That is, a preconfigured password is entered via a keyboard of the electronic device, and the electronic device then checks whether the entered password is identical to a pre-stored password. If so, the identity verification is successful and the electronic device displays an interface for an operation executed before the sleep state.

Alternatively, the process of identity verification can be done through voice verification. That is, the K sensor units that will normally operate in the low power consumption state as determined by the electronic device based on the i-th usage mode include voice sensors. After the electronic device obtains the input operation for generating the wake-up instruction, the identity verification may be performed based on a predetermined voice signal as obtained by the voice sensors.

For example, a name of the device may be preconfigured as the predetermined voice signal. When the computer X displays an interface for identity verification, the user may emit a voice signal of "X". The computer X obtains the voice signal of "X" via the voice sensors and determines whether the voice signal of "X" is identical to the predetermined voice signal through voice analysis. If so, the identity verification is successful and the electronic device displays an interface for an operation executed before the sleep state.

Hence, the whole process of switching the computer X from the sleep state to the normal operation state in the tent mode may include that the user taps the computer X and utters a voice signal by speaking the device name of the computer X, and then the computer X is switched from the sleep state to the normal operation state. The whole process matches the general users' habit and is thus more intuitive.

It is to be noted that, when the electronic device uses a single operating system and operates in different usage modes, the wake-up instruction comprises a single instruction that corresponds to the single operating system and is generated in response to different input operations corresponding to the respective different usage modes. Alternatively, when the electronic device uses different operating systems and operates in same or different usage modes, the wake-up instruction comprises different instructions that correspond to the respective different operating systems and are generated in response to different input operations corresponding to the respective different usage modes.

For example, two different operating systems, e.g., Windows operating system and IOS operating system, may be installed in the computer X. When the electronic device uses a single operating system and different usage modes, the wake-up instruction that is generated in response to different input operations corresponding to the respective different usage modes is the same instruction. The wake-up instructions corresponding to different operating systems may be the same instruction or may be different instructions.

As discussed above, with the information processing method according to the embodiment of the present invention, when the electronic device is switched from the normal operation state to the low power consumption state, the i-th mode in which the electronic device operates is determined depending on the device usage form of the electronic device and K sensor units that will normally operate in the low power consumption state are determined based on the i-th usage mode in which the electronic device operates. In response to obtaining an input operation for generating a wake-up instruction via the K sensor units when the electronic device is in the low power consumption state, the wake-up instruction is generated and the electronic device is switched from the low power consumption state to the normal operation state according to the wake-up instruction. Different usage modes correspond to same or different numbers and/or types of sensor units. Different usage modes correspond to different input operations for generating the wake-up instruction that can be obtained by the sensor units. A current usage mode corresponds to an input operation that is more suitable for an input environment in the current usage mode than input operations corresponding to other usage modes. The present invention solves the problem that it is difficult to operate an power-on/off button of an electronic device in complicated scenarios and the switching of the electronic device from the low power consumption state to the normal operation state can only be triggered by single clicking the power-on/off button of the electronic device. The present invention achieves the effect of determining, based on the usage mode of the electronic device, a switching trigger scheme most suitable for the usage mode.

Figure 4:
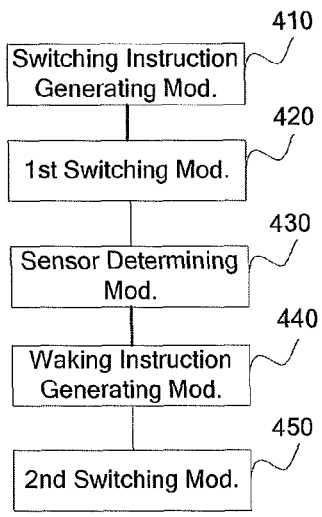
FIG. 4 is a schematic diagram showing an information processing apparatus according to an embodiment of the present invention.

Reference is now made to FIG. 4, which is a schematic diagram showing an information processing apparatus according to an embodiment of the present invention. The information processing apparatus is applied in an electronic device. The electronic device has N sensor units, M usage modes, a normal operation state and a low power consumption state, where each of M and N is an integer equal to or larger than 2. The information processing apparatus can be implemented in software, hardware or combination thereof, as a part or the whole of the electronic device. The information processing apparatus includes the following modules.

A switching instruction generating module 410 is configured to generate, when the electronic device is in an i-th usage mode from the M usage modes, the electronic device is in the normal operation state and a predetermined condition is satisfied, a switching instruction for switching the electronic device from the normal operation state to the low power consumption state in the i-th usage mode, where i is an integer equal to or larger than 1 and equal to or smaller than M.

A first switching module 420 is configured to switch the electronic device from the normal operation state to the low power consumption state according to the switching instruction generated by the switching instruction generating module 410.

A sensor determining module 430 is configured to determine, during said switching of the electronic device from the normal operation state to the low power consumption state, K sensor units from the N sensor units that will normally operate in the low power consumption state based on the i-th usage mode, where K is an integer equal to or larger than 1 and equal to or smaller than N.

A wake-up instruction generating module 440 is configured to generate, in response to obtaining an input operation for generating a wake-up instruction via the K sensor units determined by the sensor determining module 430 when the electronic device is in the low power consumption state, the wake-up instruction for switching the electronic device from the low power consumption state to the normal operation state in the i-th usage mode.

A second switching module 450 is configured to switch the electronic device from the low power consumption state to the normal operation state according to the wake-up instruction generated by the wake-up instruction generating module 440.

As discussed above, with the information processing apparatus according to the embodiment of the present invention, when the electronic device is switched from the normal operation state to the low power consumption state, K sensor units that will normally operate in the low power consumption state are determined based on the i-th usage mode in which the electronic device operates. In response to obtaining an input operation for generating a wake-up instruction via the K sensor units when the electronic device is in the low power consumption state, the wake-up instruction is generated and the electronic device is switched from the low power consumption state to the normal operation state according to the wake-up instruction. The present invention solves the problem that it is difficult to operate an power-on/off button of an electronic device in complicated scenarios and the switching of the electronic device from the low power consumption state to the normal operation state can only be triggered by single clicking the power-on/off button of the electronic device. The present invention achieves the effect of determining, based on the usage mode of the electronic device, a switching trigger scheme most suitable for the usage mode.

Figure 5:
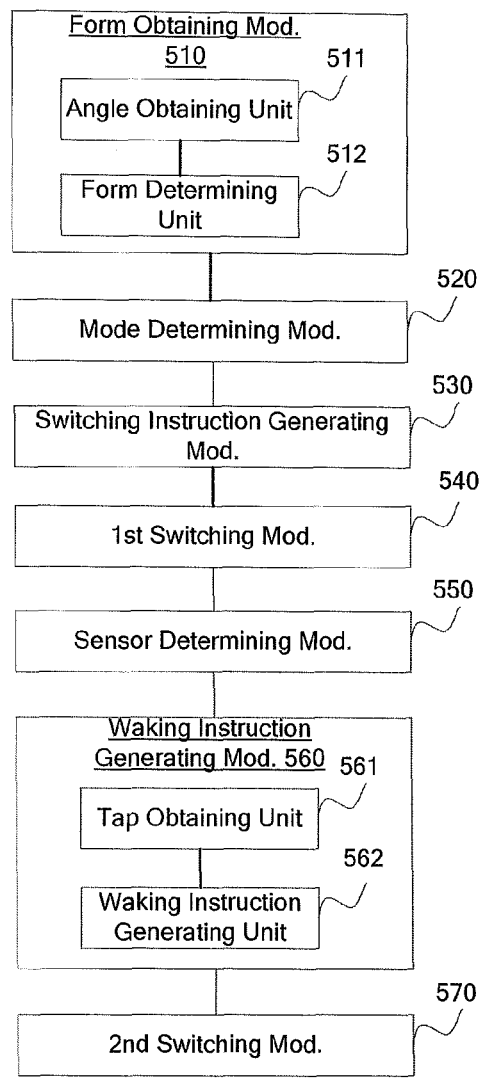
FIG. 5 is a schematic diagram showing an information processing apparatus according to another embodiment of the present invention.

Reference is now made to FIG. 5, which is a schematic diagram showing an information processing apparatus according to another embodiment of the present invention. The information processing apparatus is applied in an electronic device. The electronic device has N sensor units, M usage modes, a normal operation state and a low power consumption state, where each of M and N is an integer equal to or larger than 2. The information processing apparatus can be implemented in software, hardware or combination thereof, as a part or the whole of the electronic device. The information processing apparatus includes the following modules.

A form obtaining module 510 is configured to obtain a device usage form of the electronic device, the device usage form depending on a relative position between components of the electronic device.

The form obtaining module 510 may include an angle obtaining unit 511 configured to obtain an angle between a plane where the screen is located and a plane where the keyboard is located; and a form determining unit 522 configured to determine the device usage form of the electronic device based on the angle obtained by the angle obtaining unit and a pre-stored second correspondence. The second correspondence is a correspondence between different angles and different device usage forms.

A usage mode determining module 520 is configured to determine an usage mode of the electronic device as the i-th usage mode based on the device usage form obtained by the form obtaining module and a pre-stored first correspondence. The first correspondence is a correspondence between different device usage forms of the electronic device and the M usage modes.

A switching instruction generating module 530 is configured to generate, when the electronic device is in an i-th usage mode from the M usage modes, the electronic device is in the normal operation state and a predetermined condition is satisfied, a switching instruction for switching the electronic device from the normal operation state to the low power consumption state in the i-th usage mode, where i is an integer equal to or larger than 1 and equal to or smaller than M.

A first switching module 540 is configured to switch the electronic device from the normal operation state to the low power consumption state according to the switching instruction generated by the switching instruction generating module 530.

A sensor determining module 550 is configured to determine, during said switching of the electronic device from the normal operation state to the low power consumption state, K sensor units from the N sensor units that will normally operate in the low power consumption state based on the i-th usage mode determined by the usage mode determining module 520, where K is an integer equal to or larger than 1 and equal to or smaller than N.

In particular, the sensor determining module 550 is configured to determine the K sensor units that will normally operate in the low power consumption state based on the i-th usage mode and a pre-stored third correspondence.

Here, the third correspondence is a correspondence between different usage modes and part or all of the N sensor units, different usage modes correspond to same or different numbers and/or types of sensor units from the N sensor units, different usage modes correspond to different input operations for generating the wake-up instruction that can be obtained by sensor units from the N sensor units, and a current usage mode corresponds to an input operation that is more suitable for an input environment in the current usage mode than input operations corresponding to other usage modes.

A wake-up instruction generating module 560 is configured to generate, in response to obtaining an input operation for generating a wake-up instruction via the K sensor units when the electronic device is in the low power consumption state, the wake-up instruction for switching the electronic device from the low power consumption state to the normal operation state in the i-th usage mode.

When the i-th usage mode is unsuitable for an external input device of the electronic device to perform input operations, the K sensor units comprise vibration sensors. The wake-up instruction generating module 560 comprises: a tap obtaining unit 561 configured to obtain n successive tappings via the vibration sensor; and a wake-up instruction generating unit 562 configured to generate the wake-up instruction when the number n of the tappings obtained by the tap obtaining unit 561 matches a predetermined number and/or a tapping pattern of the n tappings obtained by the tap obtaining unit 561 matches a predetermined pattern.

A second switching module 570 is configured to switch the electronic device from the low power consumption state to the normal operation state according to the wake-up instruction generated by the wake-up instruction generating module 560.

Here, when the electronic device uses a single operating system and different usage modes, the wake-up instruction comprises a single instruction that corresponds to the single operating system and is generated in response to different input operations corresponding to the respective different usage modes, or when the electronic device uses different operating systems and same or different usage modes, the wake-up instruction comprises different instructions that correspond to the respective different operating systems and are generated in response to different input operations corresponding to the respective different usage modes.

As discussed above, with the information processing apparatus according to the embodiment of the present invention, when the electronic device is switched from the normal operation state to the low power consumption state, the i-th mode in which the electronic device operates is determined depending on the device usage form of the electronic device and K sensor units that will normally operate in the low power consumption state are determined based on the i-th usage mode in which the electronic device operates. In response to obtaining an input operation for generating a wake-up instruction via the K sensor units when the electronic device is in the low power consumption state, the wake-up instruction is generated and the electronic device is switched from the low power consumption state to the normal operation state according to the wake-up instruction. Different usage modes correspond to same or different numbers and/or types of sensor units. Different usage modes correspond to different input operations for generating the wake-up instruction that can be obtained by the sensor units. A current usage mode corresponds to an input operation that is more suitable for an input environment in the current usage mode than input operations corresponding to other usage modes. The present invention solves the problem that it is difficult to operate an power-on/off button of an electronic device in complicated scenarios and the switching of the electronic device from the low power consumption state to the normal operation state can only be triggered by single clicking the power-on/off button of the electronic device. The present invention achieves the effect of determining, based on the usage mode of the electronic device, a switching trigger scheme most suitable for the usage mode.

It is to be noted that the information processing apparatus according to the above embodiment has been described with reference to an example in which the information processing apparatus is divided into individual functional modules. In practice, the above functions may be assigned to different functional modules as desired. That is, the internal structure of the apparatus can be divided into different functional modules for achieving part or all of the above described functions. In addition, the information processing apparatus according to the above embodiment and the information processing method belong to the same concept. For details of the information processing apparatus, reference may be made to the embodiments of the methods and the description thereof will be omitted here.

Figure 6:
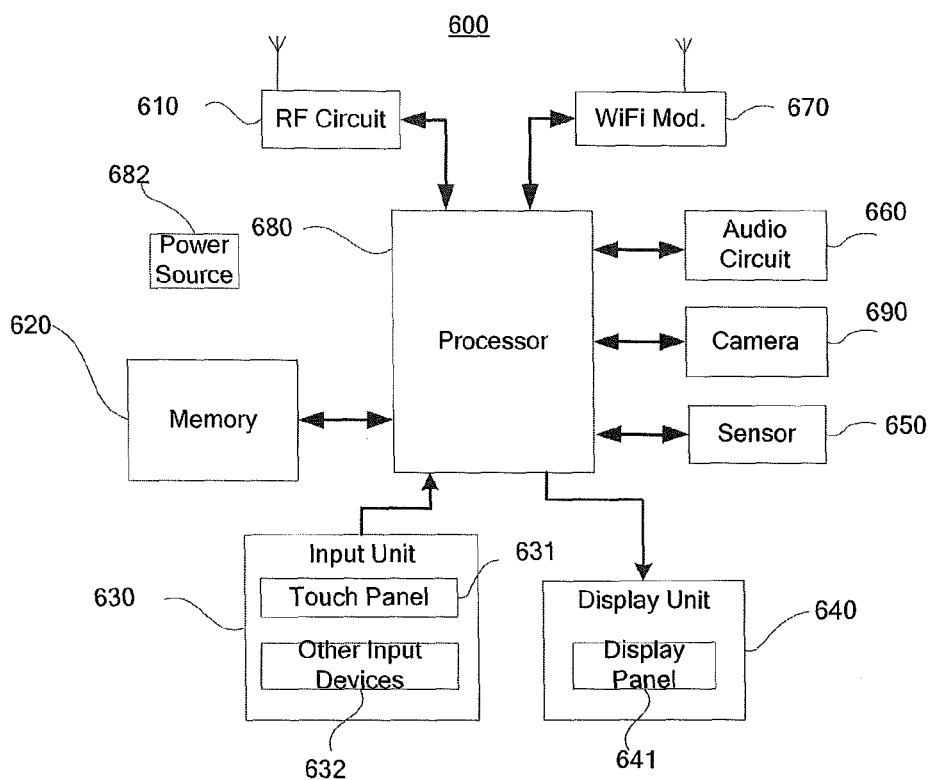
FIG. 6 is a block diagram showing an electronic device according to an embodiment of the present invention.

Reference is now made to FIG. 6, which is a block diagram showing an electronic device according to an embodiment of the present invention. The electronic device may implement the information processing method according to the above embodiment. The electronic device according to the embodiment of the present invention may include one or more of a processor for executing computer program instructions to perform various processes and methods, a Random Access Memory (RAM) or Read Only Memory (ROM) for storing information and program instructions, a memory for storing data and information, an Input/Output (I/O) device, an interface, an antenna, and the like.

The electronic device 600 may include a Radio Frequency (RF) circuit 610, a memory 620, an input unit 630, a display unit 640, a sensor 650, an audio circuit 660, a Wireless Fidelity (WiFi) module 670, a processor 680, a power source 682, a camera 690 and the like. It can be appreciated by those skilled in the art that the electronic device is not limited to the structure shown in FIG. 6. Rather, the electronic device may include more or less components than those shown in the figure; or some of its components may be combined or arranged differently.

In the following, the individual components of the electronic device 600 will be explained in detail with reference to FIG. 6.

The RF circuit 610 may be used for receiving and transmitting signals during a messaging or calling process. In particular, the RF circuit 610 receives downlink information from a base station and provides to the processor 680 for processing. In addition, the RF circuit 610 transmits uplink data to the base station. Typically, the RF circuit includes, but not limited to, an antenna, at least one amplifier, a transceiver, a coupler, a Low Noise Amplifier (LNA) and a duplexer. Further, the RF circuit 610 may communicate wirelessly with networks and other devices. Such wireless communication may employ any of communication standards or protocols, including, but not limited to: Global System of Mobile Communication (GSM), General Packet Radio Service (GPRS), Code Division Multiple Access (CDMA), Wideband Code Division Multiple Access (WCDMA), Long Term Evolution (LTE), e-mail and Short Message Service (SMS).

The memory 620 may be used for storing software programs and modules. The processor 680 may perform various functional applications and data processing of the electronic device 600 by executing the software programs and modules stored in the memory 620. The memory 620 may include mainly a program storage area for storing an operating system, an application required by at least one function (e.g., a sound playing function or an image displaying function) and a data storage area for storing data created during the usage of the electronic device (e.g., audio data, phone book, etc.). In addition, the memory 620 may include a high speed RAM, a non-volatile memory such as at least one magnetic memory device or a flash memory device, or a volatile solid state memory device.

The input unit 630 may be used for receiving input number or character information and generating a key signal input associated with user setting and function control of the electronic device 600. In particular, the input unit 630 may include a touch panel 631 and other input devices 632. The touch panel, or touch screen, may collect the user's touch operation on or near the touch panel (e.g., a user operation on or near the touch panel 631 with his/her finger, a stylus or any other appropriate object or an accessory) and drive an associated connection unit in accordance with a preconfigured procedure. Optionally, the touch panel 631 can include two parts: a touch detector and a touch controller. Here, the touch detector detects a touch location of the user's touch operation, detects a signal associated with the touch operation and transmits the signal to the touch controller. The touch controller receives the touch information from the touch detector, converts it into touch coordinates and sends them to the processor 680. The touch controller further receives a command from the processor 680 and executes it. Further, the touch panel 631 may be implemented as any of various types of touch panels including resistive, capacitive, infrared and surface acoustic wave touch panels. In addition to the touch panel 631, the input unit 630 may include other input devices 632. In particular, the other input devices 632 may include, but not limited to, one or more of a physical keyboard, a function key (e.g., a volume control key or a power-on/off key), a track ball, a mouse and a joystick.

The display unit 640 may be used for displaying information input by the user, information provided to the user, and various menus of the electronic device 600. The display unit 640 may include a display panel 641 which may optionally be configured as a Liquid Crystal Display (LCD) or an Organic Light-Emitting Diode (OLED). Further, the display panel 641 can be overlaid by the touch panel 631. When the touch panel 631 detects a touch operation on or near it, it transmits a signal to the processor 680 for determining the type of the touch event. Subsequently, the processor 680 provides a corresponding visual output on the display panel 641 based on the type of the touch event. While the touch panel 631 and the display panel 641 are shown in FIG. 6 as two separate components for implementing the input and output functions of the electronic device 600, respectively, in some embodiments they may be integrated for implementing the input and output functions of the electronic device 600.

The electronic device 600 may further include at least one sensor 650, such as a gyro sensor, a magnetic sensor, an optical sensor, a movement sensor or some other sensor. In particular, the optical sensor may include an ambient light sensor for adjusting the luminance of the display panel 641 based on the brightness of the ambient light, and a proximity sensor for deactivating the display panel 641 and/or a backlight upon sensing that the electronic device 600 is proximate to the user's ear. As a type of movement sensor, an acceleration sensor may detect magnitudes of accelerations in various directions (typically along three axes), and detect a magnitude and direction of the gravity while the electronic device is stationary. The acceleration sensor may be used in applications for recognizing the posture of the electronic device (e.g., applications for switching between landscape and portrait orientation of the screen, gaming and calibrating the posture of a magnetometer), and functions based on vibration recognition (such as pedometer and tap). The electronic device 600 may be further provided with other sensor such as a barometer, a hygrometer, a thermometer, an infrared sensor (the description thereof will be omitted here).

The audio circuit 660, the speaker 661 and the microphone 662 may provide an audio interface between the user and the electronic device 600. The audio circuit 660 may convert an audio data received into an electrical signal and send it to the speaker 661, which then converts it into a sound signal for outputting. On the other hand, the microphone 662 converts a sound signal collected into an electrical signal. The audio circuit 660 receives the electrical signal, converts it into an audio data and outputs the audio data to the processor 680. The processor 680 processes the audio data and transmits it to another electronic device via the RF circuit 610 or outputs it to the memory 620 for further processing.

WiFi is a short range wireless transmission technology. With the WiFi module 670, the electronic device 600 may assist the user to send and receive e-mails, browse web pages and access streaming media. It provides the user with wireless broadband access to the Internet. While the WiFi module 670 is shown in FIG. 6, it can be appreciated that it is not an essential component of the electronic device 600 and can be omitted as desired without departing from the scope of the present invention.

The processor 680 is a control center of the electronic device 600. It connects the individual components of the electronic device via various interfaces and cables. It also performs various functions of the electronic device 600 and processes data by running or executing the software programs and/or modules stored in the memory 620 and invoking the data stored in the memory 620, thereby monitoring the overall electronic device. Optionally, the processor 680 may include one or more processing units. Preferably, the processor 680 may incorporate an application processor which mainly handles the operating system, user interfaces and application programs, and a modem which mainly handle the wireless communication. It can be appreciated that the above modem may not be incorporated into the processor 680 in an alternative embodiment.

The electronic device 600 may further include a power source 682 (e.g., a battery) for supplying power to the components. Preferably, the power source may be logically connected to a processor 682 via a power management system, so as to achieve functions of charging, discharging and power consumption management.

The camera 690 typically includes a lens, an image sensor, an interface, a digital signal processor, a CPU and a display screen. The lens may be fixed above the image sensor and may be adjusted manually for zooming. The image sensor corresponds to a "film" in a traditional camera and is the heart for the camera to capture images. The interface is used for connecting the camera with a main board of the electronic device using parallel lines, a board-to-board connector or a spring connector, and sending the captured image to the memory 620. The digital signal processor processes the captured images mathematically, converts the captured analog images into digital images and sends them to the memory 620 via the interface.

The electronic device 600 may further include a Bluetooth module (not shown), and the description there of will be omitted here.

In addition to the one or more processors 680, the electronic device 600 includes a memory and one or more modules stored in the memory and configured to be executed by the one or more processors. The one or more modules as described above have the following functions of:

generating, when the electronic device is in an i-th usage mode from the M usage modes, the electronic device is in the normal operation state and a predetermined condition is satisfied, a switching instruction for switching the electronic device from the normal operation state to the low power consumption state in the i-th usage mode, where i is an integer equal to or larger than 1 and equal to or smaller than M;

switching the electronic device from the normal operation state to the low power consumption state according to the switching instruction;

determining, during said switching of the electronic device from the normal operation state to the low power consumption state, K sensor units from the N sensor units that will normally operate in the low power consumption state based on the i-th usage mode, where K is an integer equal to or larger than 1 and equal to or smaller than N;

generating, in response to obtaining an input operation for generating a wake-up instruction via the K sensor units when the electronic device is in the low power consumption state, the wake-up instruction for switching the electronic device from the low power consumption state to the normal operation state in the i-th usage mode; and switching the electronic device from the low power consumption state to the normal operation state according to the wake-up instruction.

Further, the one or more modules as described above have the following functions of:

obtaining a device usage form of the electronic device, the device usage form depending on a relative position between components of the electronic device; and determining an usage mode of the electronic device as the i-th usage mode based on the obtained device usage form and a pre-stored first correspondence, wherein the first correspondence is a correspondence between different device usage forms of the electronic device and the M usage modes.

The components of the electronic device comprise a screen and a keyboard connected to the screen via a rotation axis. Further, the one or more modules as described above have the following functions of:

obtaining an angle between a plane where the screen is located and a plane where the keyboard is located; and determining the device usage form of the electronic device based on the obtained angle and a pre-stored second correspondence, wherein the second correspondence is a correspondence between different angles and different device usage forms.

Further, the one or more modules as described above have the following functions of:

determining the K sensor units that will normally operate in the low power consumption state based on the i-th usage mode and a pre-stored third correspondence, wherein the third correspondence is a correspondence between different usage modes and part or all of the N sensor units, different usage modes correspond to same or different numbers and/or types of sensor units from the N sensor units, different usage modes correspond to different input operations for generating the wake-up instruction that can be obtained by sensor units from the N sensor units, and a current usage mode corresponds to an input operation that is more suitable for an input environment in the current usage mode than input operations corresponding to other usage modes.

When the electronic device uses a single operating system but different usage modes, the wake-up instruction comprises a single instruction corresponding to the single operating system that is generated in response to different input operations corresponding to the respective different usage modes, or when the electronic device uses different operating systems but same or different usage modes, the wake-up instruction comprises different instructions corresponding to the respective different operating systems that are generated in response to different input operations corresponding to the respective different usage modes.

When the i-th usage mode is unsuitable for an external input device of the electronic device to perform input operations, the K sensor units that will normally operate in the low power consumption state as determined based on the i-th usage mode comprise vibration sensors. Further, the one or more modules as described above have the following functions of:

obtaining n successive tappings via the vibration sensor; and generating the wake-up instruction when the number n of the tappings matches a predetermined number and/or a tapping pattern of the n tappings matches a predetermined pattern.

As discussed above, with the electronic device according to the embodiment of the present invention, when the electronic device is switched from the normal operation state to the low power consumption state, the i-th mode in which the electronic device operates is determined depending on the device usage form of the electronic device and K sensor units that will normally operate in the low power consumption state are determined based on the i-th usage mode in which the electronic device operates. In response to obtaining an input operation for generating a wake-up instruction via the K sensor units when the electronic device is in the low power consumption state, the wake-up instruction is generated and the electronic device is switched from the low power consumption state to the normal operation state according to the wake-up instruction. Different usage modes correspond to same or different numbers and/or types of sensor units. Different usage modes correspond to different input operations for generating the wake-up instruction that can be obtained by the sensor units. A current usage mode corresponds to an input operation that is more suitable for an input environment in the current usage mode than input operations corresponding to other usage modes. The present invention solves the problem that it is difficult to operate an power-on/off button of an electronic device in complicated scenarios and the switching of the electronic device from the low power consumption state to the normal operation state can only be triggered by single clicking the power-on/off button of the electronic device. The present invention achieves the effect of determining, based on the usage mode of the electronic device, a switching trigger scheme most suitable for the usage mode.

The numbering of the above embodiments is for the purpose of illustration only and does not represent the ranking of their preferences.

It can be appreciated by those skilled in the art that the all or part of the steps described in the above embodiments can be implemented in hardware, possibly following instructions by a program. Such program can be stored in a computer readable storage medium which can be a Read Only Memory (ROM), a magnetic disk or an optical disc.

The present invention is not limited to the preferred embodiments as described above. Any modifications, equivalents or improvements that can be made without departing from the spirit and principle of the present invention are to be encompassed by the scope of the present invention.

What is claimed is:

1. An information processing method in an electronic device having N sensor units, M usage modes, a normal operation state and a low power consumption state, where each of M and N is an integer equal to or larger than 2, the method comprising:
generating, when the electronic device is in an i-th usage mode from the M usage modes, the electronic device is in the normal operation state and a predetermined condition is satisfied, a switching instruction for switching the electronic device from the normal operation state to the low power consumption state in the i-th usage mode, where i is an integer equal to or larger than 1 and equal to or smaller than M;
switching the electronic device from the normal operation state to the low power consumption state according to the switching instruction;
determining, during said switching of the electronic device from the normal operation state to the low power consumption state, K sensor units from the N sensor units that will normally operate in the low power consumption state based on the i-th usage mode, where K is an integer equal to or larger than 1 and equal to or smaller than N;
generating, in response to obtaining an input operation for generating a wake-up instruction via the K sensor units when the electronic device is in the low power consumption state, the wake-up instruction being for switching the electronic device from the low power consumption state to the normal operation state in the i-th usage mode; and
switching the electronic device from the low power consumption state to the normal operation state according to the wake-up instruction.

2. The method of claim 1, further comprising, prior to said determining K sensor units that will normally operate in the low power consumption state based on the i-th usage mode:
obtaining a device usage form of the electronic device, the device usage form depending on a relative position between components of the electronic device; and
determining an usage mode of the electronic device as the i-th usage mode based on the obtained device usage form and a pre-stored first correspondence,
wherein the first correspondence is a correspondence between different device usage forms of the electronic device and the M usage modes.

3. The method of claim 2, wherein the components of the electronic device comprise a screen and a keyboard connected to the screen via a rotation axis, and wherein said obtaining a device usage form of the electronic device comprises:
obtaining an angle between a plane where the screen is located and a plane where the keyboard is located; and
determining the device usage form of the electronic device based on the obtained angle and a pre-stored second correspondence,
wherein the second correspondence is a correspondence between different angles and different device usage forms.

4. The method of claim 2, wherein said determining K sensor units that will normally operate in the low power consumption state based on the i-th usage mode comprises:
determining the K sensor units that will normally operate in the low power consumption state based on the i-th usage mode and a pre-stored third correspondence,
wherein the third correspondence is a correspondence between different usage modes and part or all of the N sensor units,
the different usage modes correspond to the same or different numbers and/or types of sensor units from the N sensor units, the different usage modes correspond to different input operations for generating the wake-up instruction that can be obtained by sensor units from the N sensor units, and a current usage mode corresponds to an input operation that is more suitable for an input environment in the current usage mode than input operations corresponding to any other usage modes.

5. The method of claim 4, wherein
when the electronic device uses a single operating system and operates in different usage modes, the wake-up instruction comprises a single instruction that corresponds to the single operating system and is generated in response to different input operations corresponding to the respective different usage modes, or
when the electronic device uses different operating systems and operates in different usage modes, the wake-up instruction comprises different instructions that correspond to the respective different operating systems and are generated in response to different input operations corresponding to the respective different usage modes.

6. The method of claim 1, wherein, when the i-th usage mode is unsuitable for inputting by an external input device of the electronic device, the K sensor units that will normally operate in the low power consumption state as determined based on the i-th usage mode comprise vibration sensors, and
said generating a wake-up instruction in response to obtaining an input operation for generating the wake-up instruction via the K sensor units when the electronic device is in the low power consumption state comprises:
obtaining n successive tappings via the vibration sensors; and
generating the wake-up instruction when the number n of the tappings matches a predetermined number and/or a tapping pattern of the n tappings matches a predetermined pattern,
wherein n is an integer equal to or larger than 1.

7. An electronic device having N sensor units, M usage modes, a normal operation state and a low power consumption state, where each of M and N is an integer equal to or larger than 2, the electronic device comprising at least one processor configured to implement:
a switching instruction generating module configured to generate, when the electronic device is in an i-th usage mode from the M usage modes, the electronic device is in the normal operation state and a predetermined condition is satisfied, a switching instruction for switching the electronic device from the normal operation state to the low power consumption state in the i-th usage mode, where i is an integer equal to or larger than 1 and equal to or smaller than M;

a first switching module configured to switch the electronic device from the normal operation state to the low power consumption state according to the switching instruction generated by the switching instruction generating module;

a sensor determining module configured to determine, during said switching of the electronic device from the normal operation state to the low power consumption state, K sensor units from the N sensor units that will normally operate in the low power consumption state based on the i-th usage mode, where K is an integer equal to or larger than 1 and equal to or smaller than N;

a wake-up instruction generating module configured to generate, in response to obtaining an input operation for generating a wake-up instruction via the K sensor units when the electronic device is in the low power consumption state, the wake-up instruction for switching the electronic device from the low power consumption state to the normal operation state in the i-th usage mode; and a second switching module configured to switch the electronic device from the low power consumption state to the normal operation state according to the wake-up instruction generated by the wake-up instruction generating module.

8. The electronic device of claim 7, further comprising:

a form obtaining module configured to obtain a device usage form of the electronic device, the device usage form depending on a relative position between components of the electronic device; and a usage mode determining module configured to determine an usage mode of the electronic device as the i-th usage mode based on the device usage form obtained by the form obtaining module and a pre-stored first correspondence, wherein the first correspondence is a correspondence between different device usage forms of the electronic device and the M usage modes.

9. The electronic device of claim 8, wherein the components of the electronic device comprise a screen and a keyboard connected to the screen via a rotation axis, and wherein the form obtaining module comprises:

an angle obtaining unit configured to obtain an angle between a plane where the screen is located and a plane where the keyboard is located; and a form determining unit configured to determine the device usage form of the electronic device based on the angle obtained by the angle obtaining unit and a pre-stored second correspondence, wherein the second correspondence is a correspondence between different angles and different device usage forms.

10. The electronic device of claim 8, wherein the sensor determining module is configured to determine the K sensor units that will normally operate in the low power consumption state based on the i-th usage mode and a pre-stored third correspondence, wherein the third correspondence is a correspondence between different usage modes and part or all of the N sensor units, the different usage modes correspond to same or different numbers and/or types of sensor units from the N sensor units, the different usage modes correspond to different input operations for generating the wake-up instruction that can be obtained by sensor units from the N sensor units, and a current usage mode corresponds to an input operation that is more suitable for an input environment in the current usage mode than input operations corresponding to other usage modes.

11. The electronic device of claim 10, wherein when the electronic device uses a single operating system and operates in different usage modes, the wake-up instruction comprises a single instruction that corresponds to the single operating system and is generated in response to different input operations corresponding to the respective different usage modes, or when the electronic device uses different operating systems and operates in same or different usage modes, the wake-up instruction comprises different instructions that correspond to the respective different operating systems and are generated in response to different input operations corresponding to the respective different usage modes.

12. The electronic device of claim 7, wherein, when the i-th usage mode is unsuitable for inputting by an external input device of the electronic device, the K sensor units comprise vibration sensors, and the wake-up instruction generating module comprises:

a tap obtaining unit configured to obtain n successive tappings via the vibration sensor; and a wake-up instruction generating unit configured to generate the wake-up instruction when the number n of the tappings matches a predetermined number and/or a tapping pattern of the n tappings matches a predetermined pattern, wherein n is an integer equal to or larger than 1.

* * * * *